(12) United States Patent
Kumar

(10) Patent No.: US 10,838,892 B1
(45) Date of Patent: Nov. 17, 2020

(54) MULTISTAGE ROUND ROBIN ARBITRATION

(71) Applicant: Xilinx, Inc., San Jose, CA (US)

(72) Inventor: Tejinder Kumar, Dist-Moga (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/525,444

(22) Filed: Jul. 29, 2019

(51) Int. Cl.
*G06F 3/00* (2006.01)
*G06F 13/20* (2006.01)
*G06F 9/48* (2006.01)

(52) U.S. Cl.
CPC .......... *G06F 13/20* (2013.01); *G06F 9/4881* (2013.01); *G06F 2213/36* (2013.01)

(58) Field of Classification Search
None
See application file for complete search history.

(56) References Cited

U.S. PATENT DOCUMENTS

2003/0172212 A1* 9/2003 Lavigne ................ G06F 13/364 710/111
2008/0059674 A1* 3/2008 Shi .......................... G06F 13/364 710/243
2013/0091505 A1* 4/2013 Yu .......................... G06F 9/5038 718/103
2014/0226166 A1* 8/2014 Kumar .................. G01T 1/1647 356/601

* cited by examiner

*Primary Examiner* — Henry Tsai
*Assistant Examiner* — Dean Phan
(74) *Attorney, Agent, or Firm* — Amir Tabarrok, Rimon Law Firm Evolved

(57) ABSTRACT

A device includes a first and a second stage round robin arbitrations. The first stage receives request signals and selects a subset the request signals. Each request signal is associated with whether a component is requesting access to a common resource. The second stage receives the selected subset and grants access to the common resource to each request signal of the selected subset that is requesting access, in a round robin fashion. The second stage outputs an enable signal to the first stage when the selected subset is processed. The first stage selects another subset and transmits the selected another subset to the second stage for round robin processing thereof. The process is repeated until all subsets with at least one request signal to access the common resource is processed and granted access in a round robin fashion.

16 Claims, 10 Drawing Sheets

MULTISTAGE ROUND ROBIN ARBITRATION

TECHNICAL FIELD

The disclosure generally relates to arbitration scheme to grant access a common resource and more particularly a round robin arbitration scheme to grant access to a common resource.

BACKGROUND

Round robin scheme is generally used to grant access to a common resource. For example, round robin arbiters are generally used to arbitrate among multiple request signals. Recently system performance has improved by using high numbers of queues and further by using larger queue size. In some conventional systems scanning arbiters may be used to facilitate access grants as quickly as possible. However, scanning arbiters suffer from high latency as the number of request signals increases. Furthermore, scanning arbiters result in reduced clock frequency when the window size is increased to reduce latency.

SUMMARY

Accordingly, a need has arisen to provide an arbitration scheme that is both high speed and low latency. A multistage round robin arbitration architecture is proposed that is both high speed and has lower latency in comparison to the conventional architecture. The proposed architecture supports pipelining to improve performance, thereby resulting in an increased operating clock frequency. Moreover, the proposed architecture results in lower latency when arbitrating among a large number of request signals and queues.

In some embodiments, the proposed multistage round robin arbitration architecture includes a first stage round robin arbitration and a second stage round robin arbitration. The first stage round robin arbitration is configured to receive a plurality of request signals and select a subset of the plurality of request signals. Each request signal is associated with whether a component is requesting access to a common resource. The second stage round robin arbitration is configured to receive the selected subset and further configured to grant access to the common resource to each request signal of the selected subset that is requesting access to the common resource in a round robin fashion. The second stage round robin arbitration is further configured to output an enable signal to the first stage round robin arbitration when all request signals within the selected subset that is requesting access to the common resource is granted access in a round robin fashion. The first stage round robin arbitration is configured to select another subset of the plurality of request signals and transmit the selected another subset of the plurality of request signals to the second stage round robin arbitration for round robin processing thereof. It is appreciated that this process is repeated until all subsets with at least one request signal to access the common resource are processed and granted access in a round robin fashion.

According to some embodiment the arbitration architecture includes a plurality of logical gates, a first round robin arbiter, a multiplexer, and a second round robin arbiter. The plurality of logical gates is configured to receive a plurality of request signals. Each logical gate of the plurality of logical gates is configured to receive a set of request signals of the plurality of request signals. Each request signal is associated with whether a component is requesting access to a common resource. Each logical gate of the plurality of logical gates is further configured to output a signal indicating whether a request signal of the corresponding set of request signals is asserted to access the common resource. The first round robin arbiter is configured to receive output signals from the plurality of logical gates. The first round robin arbiter is configured to output an index signal identifying a logical gate of the plurality of logical gates where the request signal is asserted. The multiplexer is configured to receive the plurality of request signals. The multiplexer is further configured to receive the index signal and wherein the multiplexer selects a set of request signals of the plurality of request signals corresponding to the request signal that is asserted. The second round robin arbiter is configured to receive the selected set of request signals of the plurality of request signals from the multiplexer and further configured to grant access to the common resource to each request signal of the selected set of request signals that is requesting access to the common resource in a round robin fashion. The second round robin arbiter is further configured to output a first round robin enable signal to the first round robin arbiter to select another logic gate of the plurality of logical gates where a request signal is asserted. In some embodiments, the plurality of logical gates comprises a logical OR gate.

The arbitration architecture may further include a delay element, e.g., a flop delay, coupled to the second round robin arbiter. The delay element is configured to receive an enable signal and to delay the enable signal by an amount of time needed for the first round robin arbiter to generate the index signal. The delayed enable signal initiates the second round robin arbitration signal to process received signals. In some embodiments, the arbitration architecture may further include another multiplexer coupled to an output of the delay element. The another multiplexer is configured to receive the delayed enable signal and further configured to receive the enable signal. The another multiplexer selects delayed enable signal or the enable signal based on the first round robin enable signal generated by the second round robin arbiter. The another multiplexer is configured to output the selected signal to the second round robin arbiter to initiate the second round robin arbiter to process received signals.

In some embodiments, the first round robin arbiter is configured to receive the first round robin enable signal output and to select the another logic gate of the plurality of logical gates where a request signal is asserted in a round robin fashion. The first round robin arbiter is configured to output an updated index signal based on the another logic gate. The multiplexer is configured to receive the updated index signal and selects another set of request signals of the plurality of request signals corresponding to the request signal that is asserted. The second round robin arbiter is further configured to receive the selected another set of request signals of the plurality of request signals from the multiplexer and grant access to the common resource to each request signal of the selected another set of request signals in a round robin fashion.

It is appreciated that the second round robin arbiter is further configured to output another first round robin enable signal to the first round robin arbiter to select yet another logic gate of the plurality of logical gates where a request signal is asserted to access the common resource.

It is appreciated that the common resource may be a bus, storage memory, network cards, etc. It is further appreciated that each set of request signals of the plurality of request signals is formed based on priority associated therewith.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1A:
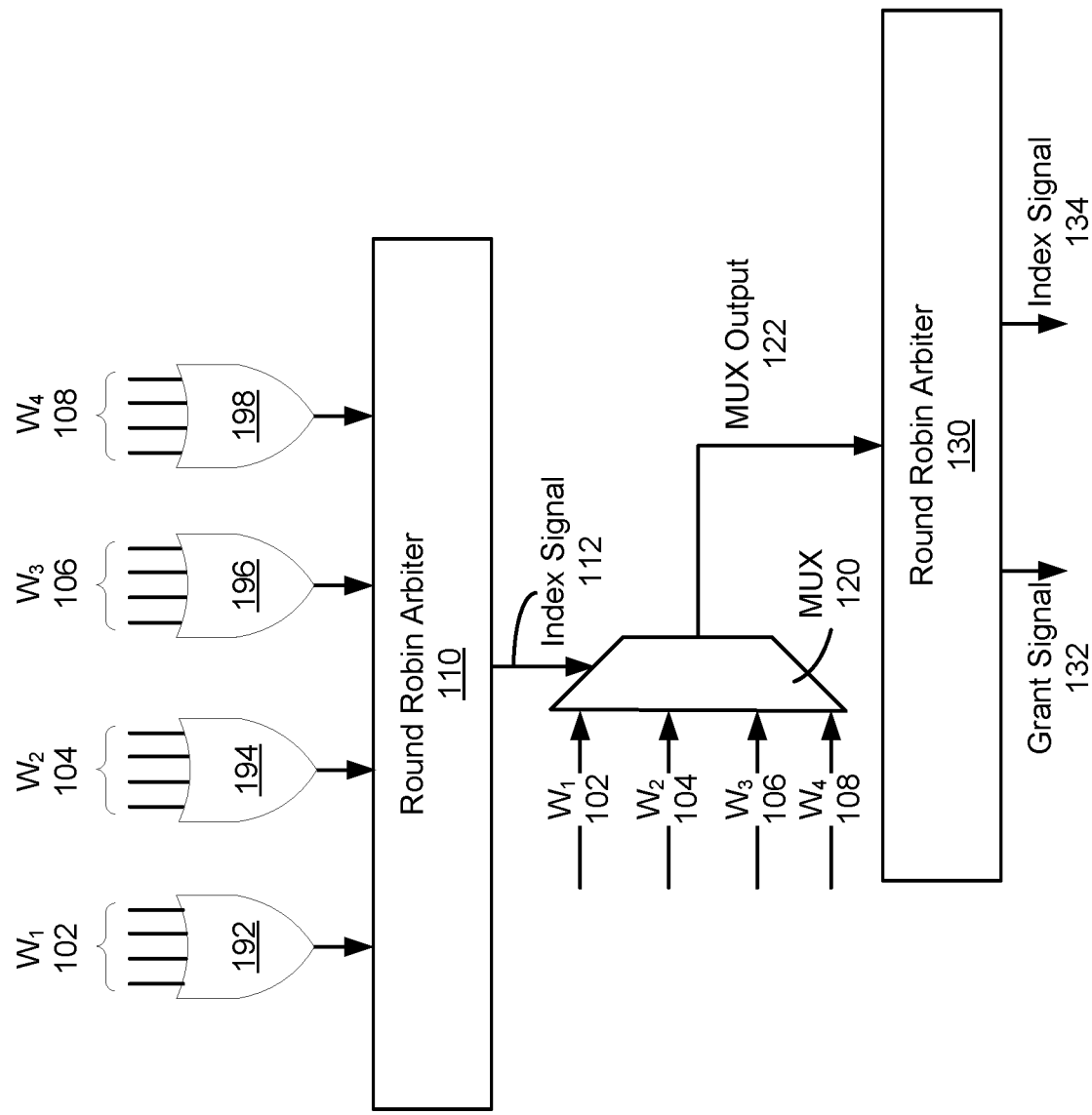
FIGS. 1A-1C show a block diagram depicting arbitration architecture, according to some examples.

Examples described herein relate to a multistage round robin arbitration architecture to grant access to a common resource, e.g., system buses, storage memories, network cards, processors, etc. Round robin arbitration architecture is a key component in defining the latency and performance of the system. The proposed multistage round robin arbitration architecture may be used regardless of the number of queues and the queue sizes and the number of request signals while achieving reduced latency and increased operating clock frequency. The proposed multistage round robin arbitration architecture achieves both high speed and has lower latency in comparison to the conventional architecture. The proposed architecture supports pipelining to improve performance, thereby resulting in an increased operating clock frequency. Moreover, the proposed architecture results in lower latency when arbitrating among a large number of request signals and queues. It is appreciated that while round robin architecture is described the proposed architecture may be extended to other types of arbitration schemes, e.g., priority arbitration, using a similar architecture. As such, description of the multistage arbitration architecture in a round robin fashion is for illustrative purposes only and should not be construed as limiting the scope of the embodiments.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. For example, various methods according to some examples can include more or fewer operations, and the sequence of operations in various methods according to examples may be different than described herein. In addition, an illustrated example need not have all the aspects or advantages shown. An aspect or an advantage described in conjunction with a particular example is not necessarily limited to that example and can be practiced in any other examples even if not so illustrated or if not so explicitly described.

Some general concepts will first be described to clarify terms and nomenclature used throughout this description.

Figure 1B:
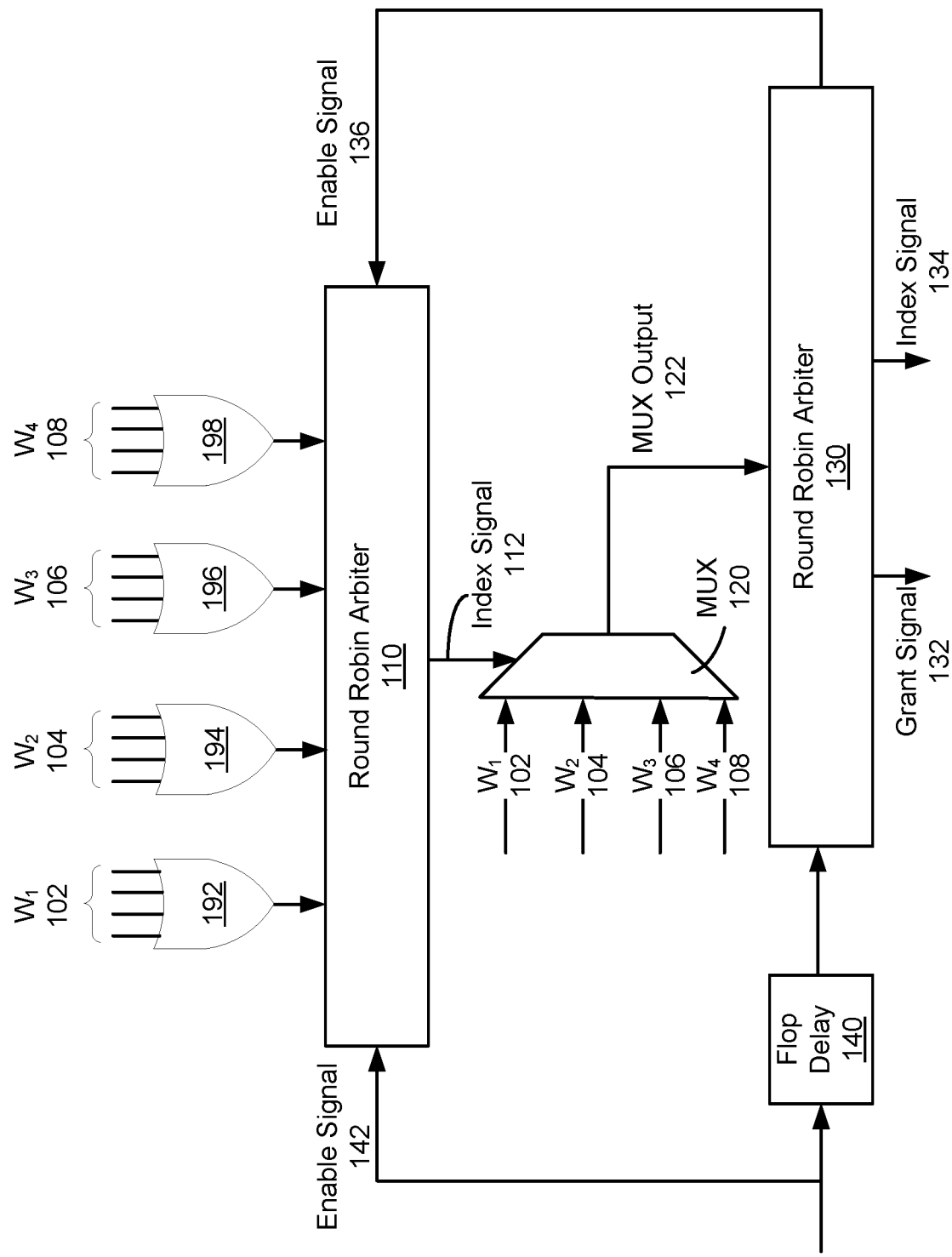
Figure 1C:
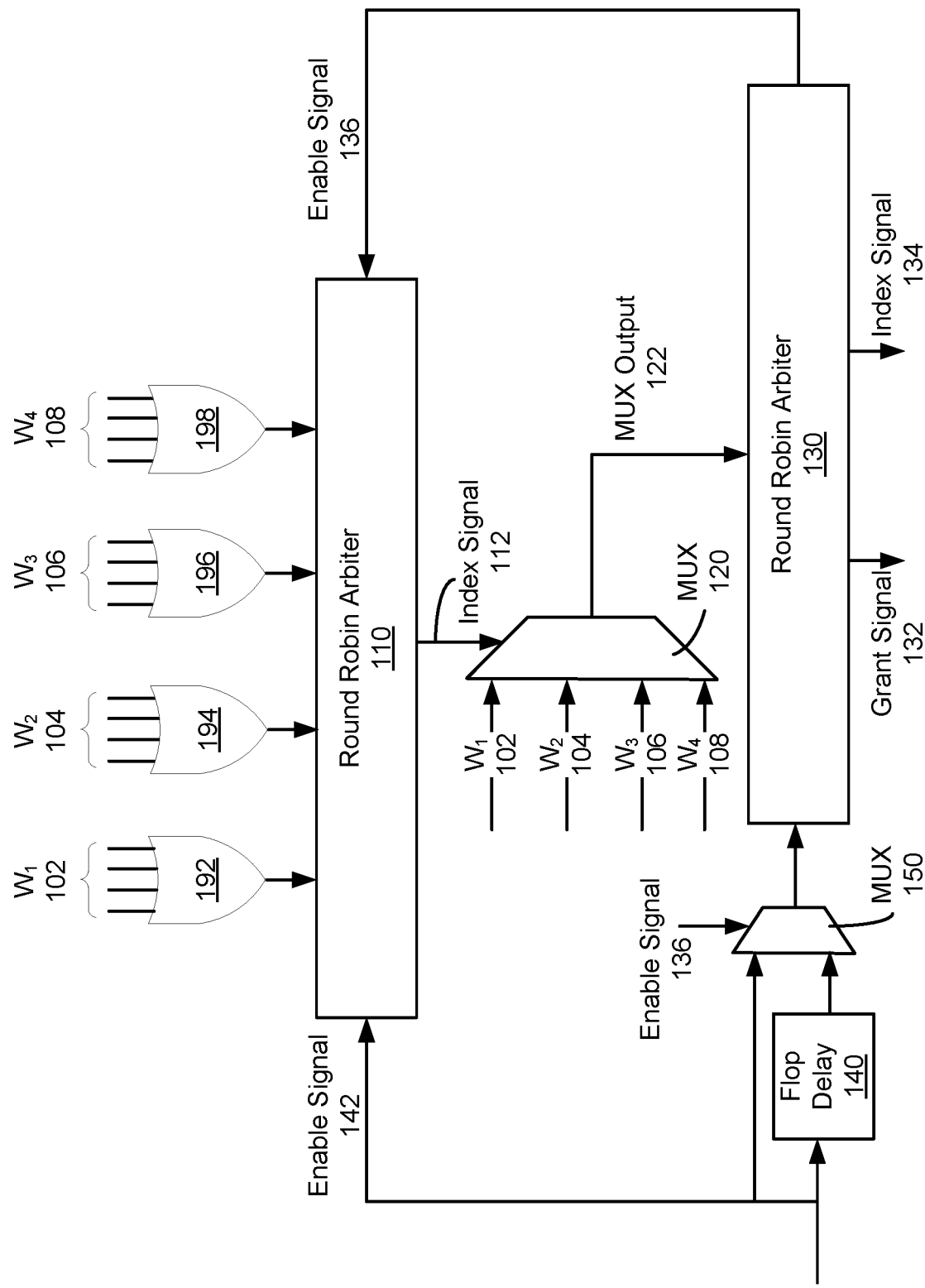

Referring now to FIGS. 1A-1C, a block diagram depicting arbitration architecture, according to some examples are shown. In the proposed architecture, a plurality of logical gates, e.g., OR logical gates 192, 194, 196, and 198, receives a plurality of request signals. The request signals may be received as a group or may have been grouped together as words, e.g., $W_1$ 102, $W_2$ 104, $W_3$ 106, and $W_4$ 108. It is appreciated that in some embodiments, the grouping may be done to improve performance and efficiency and/or it may be based on priority associated with the request signals. The received request signals are request signals from a component to access a common resource, e.g., system bus, storage memories, network cards (e.g., NIC cards), processor, etc.

In some embodiments, each logical component outputs a signal indicative of whether at least one request signal within the received word is asserted indicating that a component associated with that request signal is requesting access to the common resource. For example, in this illustrative embodiment, the logical OR gate 192 receives the word $W_1$ 102 that is a grouping of four request signals. Each request signal of the word $W_1$ 102 is associated with its corresponding component in the system and if the associated request signal is asserted high it indicates that the corresponding component is requesting access to the common resource. Accordingly, if any one of the four request signals in $W_1$ 102 is asserted high, the logical OR gate 192 outputs a signal that is high indicating that at least one component corresponding to a request signal within $W_1$ 102 is requesting access to the common resource. In contrast, if none of the request signals within the $W_1$ 102 is asserted high, the logical OR gate 192 outputs a signal that is asserted low indicating that no component corresponding to the request signals within $W_1$ 102 is requesting access to the common resource. It is appreciated that other logical gates similarly output a corresponding for their respective received word. It is appreciated that only 4 logical OR gates with four inputs are shown. However, it is appreciated that any number of OR gates with any number of inputs may be used. Even further, other embodiments may use a logical gate other than an OR gate. As such, any discussion with respect to the number of logical gates, the OR gate, and the number of inputs is for illustrative purposes and not intended to limit the scope of the embodiments.

In some embodiments, the logical gates 192-198 output their respective signals to a round robin arbiter 110. In this illustrative embodiment, the round robin arbiter is a 4:2 where it receives four inputs and outputs a signal with 2 bits. The round robin arbiter 110 on the first pass may select the first output signal from the logical OR gates that is asserted high. For example, presuming for the purposes of this illustration that logical OR gate 192 outputs a signal asserted high indicating that at least one request signal within the $W_1$ 102 is requesting access to the common resource, but that logical OR gates 194 and 196 output a signal asserted low indicating that no component associated with those request signals is requesting access to the common resource, and finally the logical OR gate 198 outputs a signal asserted high indicating that at least one request signal within the $W_4$ 108 is requesting access to the common resource. The round robin arbiter 110 may select the logical OR gate 192 because it is the first one in the grouping of the logical OR gates with an output signal asserted high. However, it is appreciated that in some embodiments, a different ordering selection may be done, e.g., the round robin arbiter 110 may select the logical OR gate 198 first.

In some embodiments, the round robin arbiter 110 may output an index signal 112 that identifies the logical OR gate 192 and the request signals in $W_1$ 102. Since the round robin arbiter 110 is a 4 input arbiter, it may use two bits to identify the logical OR gate. In this illustrative example, 00 may be used to identify logical OR gate 192 and its corresponding $W_1$ 102, 01 may be used to identify logical OR gate 194 and its corresponding $W_2$ 104, 10 may be used to identify logical OR gate 196 and its corresponding $W_3$ 106, and 11 may be used to identify logical OR gate 198 and its corresponding $W_4$ 108. In this illustrative example, the index signal 112 outputs a 00 value indicating the logical OR gate 192 and its corresponding $W_1$ 102.

In some embodiments, a multiplexer 120 may receive the index signal 112 to select between the different words, $W_1$ 102, $W_2$ 104, $W_3$ 106, and $W_4$ 108. In this illustrative example, since the index signal 112 has a 00 value, the word $W_1$ 102 is selected. The multiplexer 120 outputs a signal 122 which is the selected word, e.g., $W_1$ 102.

In some embodiments, a second round robin arbiter 130 may be used and receives the output signal 122. In this example, the MUX output signal 122 is $W_1$ 102. The round robin arbiter 130 processes the requests within the $W_1$ 102. For illustrative purpose it is presumed that 3 of the 4 request signals within $W_1$ 102 are asserted high indicating that their respective components are requesting access to the common resource, e.g., the first, third, and fourth request signals are asserted high for illustrative purposes. Since the words are groups of 4 request signals, then the round robin arbiter 130 may use 2 bits to identify the request signal and its corresponding component. For example, 00 may be used to identify the first request signal within $W_1$ 102 and its corresponding component, 01 may be used to identify the second request signal within $W_1$ 102 and its corresponding component, 10 may be used to identify the third request signal within $W_1$ 102 and 11 may be used to identify the first request signal within $W_1$ 102 and its corresponding component.

In some embodiments, the round robin arbiter 130 outputs an index signal 134 with values 00 corresponding to the first request signal of $W_1$ 102 being asserted high. As such, the component corresponding to the first request signal is granted access to the common resource by issuing grant signal 132. Once the component that was just granted access is done with the common resource, the round robin arbiter 130 processes the remaining request signals within the word $W_1$ 102. However, in this example since the second request signal as identified by 01 is not asserted high it indicates that the component corresponding to that request signal is not requesting access to the common resource and therefore is skipped. The round robin arbiter 130 then processes the remaining request signals within the word $W_1$ 102. In this example, since the third request signal as identified by 10 is asserted high it indicates that the component corresponding to that request signal is requesting access to the common resource. As such, the round robin arbiter 130 outputs the index signal 134 with value 10 and it outputs the grant signal 132 to grant the component corresponding to the 10 request signal within the word $W_1$ 102 access to the common resource. Once the component that was just granted access is done with the common resource, the round robin arbiter 130 processes the remaining request signals within the word $W_1$ 102. In this example, since the fourth request signal as identified by 11 is asserted high it indicates that the component corresponding to that request signal is requesting access to the common resource. As such, the round robin arbiter 130 outputs the index signal 134 with value 11 and it outputs the grant signal 132 to grant the component corresponding to the 11 request signal within the word $W_1$ 102 access to the common resource. Once the component that was just granted access is done with the common resource, the round robin arbiter 130 processes the remaining request signals within the word $W_1$ 102. However, since no other request signal remains in the word $W_1$ 102, the round robin arbiter 130 notifies the round robin arbiter 110 to process the next word.

As presented above and for illustrative purposes it was presumed that words $W_2$ 104 and $W_3$ 106 have no request signals that is asserted high indicative of an access grant request to the common resource, the round robin arbiter 110 selects the next word with at least one request signal being asserted high, e.g., $W_4$ 108.

In some embodiments, the round robin arbiter 110 may output an index signal 112 that identifies the logical OR gate 198 and the request signals in $W_4$ 108. In this illustrative example, the index signal 112 outputs a 11 value indicating the logical OR gate 198 and its corresponding $W_4$ 108.

In some embodiments, a multiplexer 120 may receive the index signal 112 to select between the different words, $W_1$ 102, $W_2$ 104, $W_3$ 106, and $W_4$ 108. In this illustrative example, since the index signal 112 has a 11 value, the word $W_4$ 108 is selected. The multiplexer 120 outputs a signal 122 which is the selected word, e.g., $W_4$ 108.

In some embodiments, the round robin arbiter 130 receives the output signal 122. In this example, the MUX output signal 122 is $W_4$ 108. The round robin arbiter 130 processes the requests within the $W_4$ 108. For illustrative purpose it is presumed that 2 of the 4 request signals within $W_4$ 108 are asserted high indicating that their respective components are requesting access to the common resource, e.g., the first, and third request signals are asserted high for illustrative purposes. Since the words are groups of 4 request signals, then the round robin arbiter 130 may use 2 bits to identify the request signal and its corresponding component. For example, 00 may be used to identify the first request signal within $W_4$ 108 and its corresponding component, 01 may be used to identify the second request signal within $W_4$ 108 and its corresponding component, 10 may be used to identify the third request signal within $W_4$ 108 and 11 may be used to identify the first request signal within $W_4$ 108 and its corresponding component.

In some embodiments, the round robin arbiter 130 outputs an index signal 134 with values 00 corresponding to the first request signal of $W_4$ 108 being asserted high. As such, the component corresponding to the first request signal is granted access to the common resource by issuing grant signal 132. Once the component that was just granted access is done with the common resource, the round robin arbiter 130 processes the remaining request signals within the word $W_4$ 108. However, in this example since the second request signal as identified by 01 is not asserted high it indicates that the component corresponding to that request signal is not requesting access to the common resource and therefore is skipped. The round robin arbiter 130 then processes the remaining request signals within the word $W_4$ 108. In this example, since the third request signal as identified by 10 is asserted high it indicates that the component corresponding to that request signal is requesting access to the common resource. As such, the round robin arbiter 130 outputs the index signal 134 with value 10 and it outputs the grant signal 132 to grant the component corresponding to the 10 request signal within the word $W_4$ 108 access to the common resource. Once the component that was just granted access is done with the common resource, the round robin arbiter 130 processes the remaining request signals within the word $W_4$ 108. However, in this example since the fourth request signal as identified by 11 is not asserted high it indicates that the component corresponding to that request signal is not requesting access to the common resource and therefore is skipped. The round robin arbiter 130 processes the remaining request signals within the word $W_4$ 108. However, since no other request signal remains in the word $W_4$ 108, the round robin arbiter 130 notifies the round robin arbiter 110 to process the next word.

It is appreciated that describing the embodiments with two stage round robin arbiters, four logical OR gates, and four words along with one multiplexer is for illustrative purposes only and should not be construed as limiting the scope of the embodiments.

Referring now to FIG. 1B an architecture similar to that of FIG. 1A is shown. In this embodiment, the round robin arbiter 130 also outputs an enable signal 136 to notify the round robin arbiter 110 to process the next word or transmit its output. It is appreciated that the enable signal 136 is asserted high when the round robin 130 completes processing of the word in a round robin fashion.

It is appreciated that in some embodiments, a global enable signal 142 may also be used. The global enable signal 142 when asserted indicates that arbitration is requested. The global enable signal 142 may be sent to both the round robin arbiter 110 and round robin arbiter 130. However, since a multistage round robin arbitration architecture is used, the enable signal 142 may be logically ANDed with the enable signal 136, such that the round robin arbiter 110 only starts processing the next work or outputs after the subsequent round robin arbiters, e.g., round robin arbiter 130, is done and ready to accept the next set of requests. Moreover, it is appreciated that a flop delay 140 may be used to delay the global enable signal 142 that is input to the round robin arbiter 130. It is appreciated that the delay may be the amount of time needed for the round robin arbiter 110 to generate the index signal 112. As such, the round robin arbiter 130 is ready to process the request signals as soon as the preceding round robin arbiter, e.g., round robin arbiter 110, generates its output.

Referring now to FIG. 1C an architecture similar to that of FIG. 1B is shown. In this embodiment, the global enable signal 142 and the delayed global enable signal are fed into a multiplexer 150. As such, the number of cycles required for the global enable signal 142 to reach the round robin arbiter 130 is reduced.

Figure 2A:
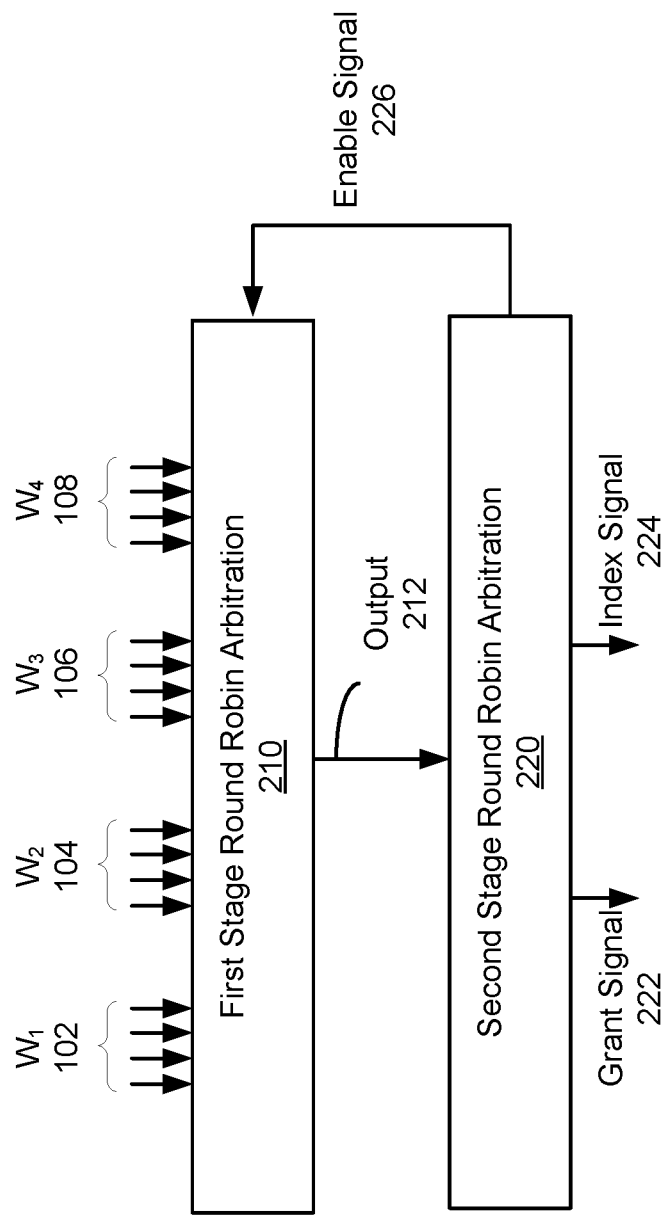
FIGS. 2A-2B show illustrative two stage arbitration architecture, according to some examples.
Figure 2B:
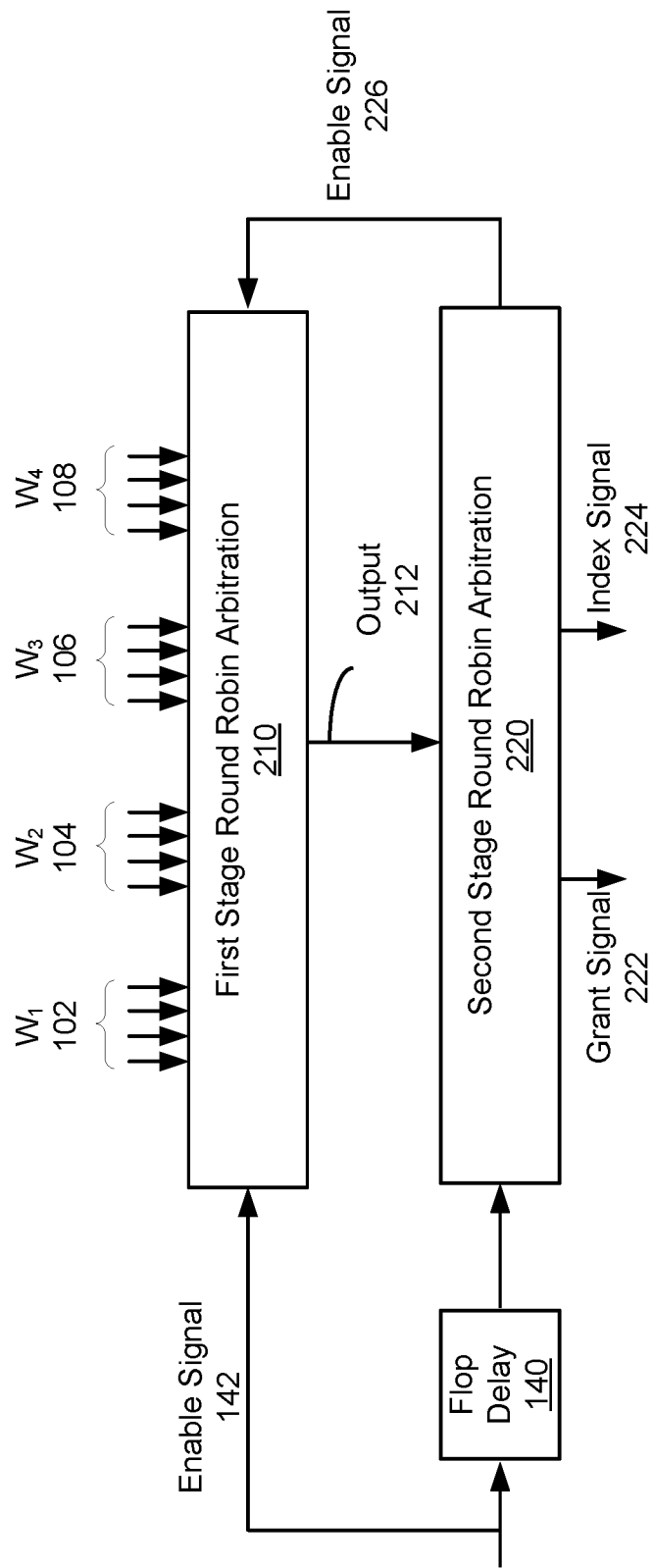

Referring now to FIGS. 2A-2B, illustrative two stage arbitration architecture, according to some examples are shown. Referring to FIG. 2A, a two stage round robin arbitration architecture is shown. In this embodiment, a first stage round robin arbitration 210 and a second stage round robin arbitration 220. The first stage round robin arbitration 210 receives a plurality of words similar to that of FIG. 1A. The first stage round robin arbitration 210 selects a word between the received words where the selected word has at least one request signal that is asserted high indicating that its corresponding component is requesting access to a common resource. For example, the first word with at least one request signal being asserted high may be $W_3$ 106. As such, words $W_1$ 102 and $W_2$ 104 are skipped. Once the word is selected, e.g., $W_3$ 106, the signal 212 is output similar to the one described in FIGS. 1A-1C. The signal 212 is input into the second stage round robin arbitration 220 such that the selected word can be processed. The second stage round robin arbitration 220 processes the received word and grants access to the component requesting access to the common resource, e.g., in a round robin fashion. As such, the second stage round robin arbitration 220 outputs index signals 224 sequentially, each one corresponding a component within the word $W_3$ 106 that is requesting access to the common resource and it further outputs the grant signal 222 to grant access. It is appreciated that the request signals within the word that are not asserted high indicate that the corresponding component is not requesting access to the common resource and it is skipped. Once the second stage round robin arbitration 220 processes all the request signals within the selected word, the enable signal 226 is generated and sent to the preceding stage round robin arbitration, e.g., first stage round robin arbitration 210. Accordingly, the first stage round robin arbitration 210 processes the next word with at least one request signal being asserted high indicating that at least one component corresponding to the request signal is requesting access to the common resource, e.g., $W_4$ 108. It is appreciated that the process described for the first stage round robin arbitration 210 and the second stage round robin arbitration 220 is repeated until all request signals are processed.

Referring now to FIG. 2B the architecture similar to FIG. 2A is shown with the flop delay similar to FIG. 1B being added. The architecture shown in FIG. 2B operates substantially similar to that of FIG. 2A with the delay of the enabled signal as described in FIG. 1B.

Figure 3:
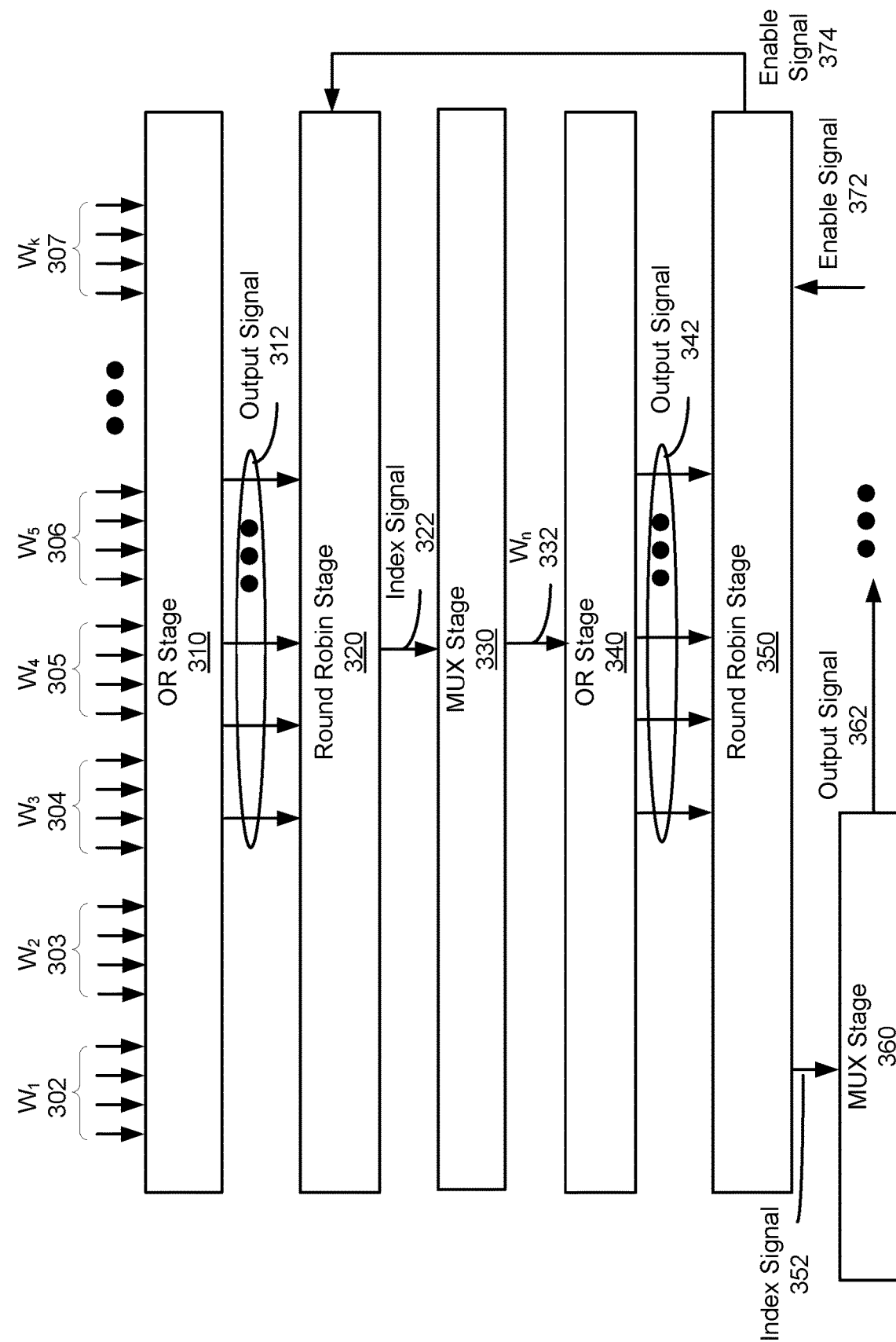
FIG. 3 shows a multistage arbitration architecture, according to some examples.

Referring now to FIG. 3, a multistage arbitration architecture, according to some examples is shown. FIG. 3 is similar to that of FIGS. 1A-1C, as described above. However, in FIG. 3 multiple stages are used. In this embodiment, the OR stage 310 is similar to the logical OR gates 192-198 and it receives words, $W_1$ 302, $W_2$ 303, $W_3$ 304, $W_4$ 305, $W_5$ 306, . . . , $W_k$ 307 where each word has multiple request signals that correspond to various components. Each word may be m bits and therefore k×m request signals are received. The OR stage 310 output signals 312, similar to the outputs from the logical OR gates 192-198 in FIGS. 1A-1C. The output signals 312 are input to the round robin stage 320 that functions substantially similar to the round robin arbiter 110. The round robin stage 320 outputs an index signal 322 similar to the round robin arbiter 110. The MUX stage 330 functions similar to the multiplexer 120 and selects a word from the received words based on the index signal 322. The OR stage 340 splits the selected word $W_n$ 332 into a number of subwords, e.g., p words, each with q number of request signals. As such, the OR stage 340 outputs the subwords to round robin stage 350 that selects one of the subwords for processing. The index signal 352 identifying the subword is input to the MUX stage 360 that operates substantially similar to MUX stage 330. MUX stage 360 generates the output signal 362 and the process continues until the last round robin stage. The last round robin stage processes the words split into smaller words by prior stages, as described, to grant access to the common resource for each requesting signal within the split of small words received. Once all request signals are processed within the small word, the process returns to prior stage to select a different words and the process continues until all request signals with each word is ultimately processed and every component corresponding to the request signal being asserted high is granted access to the common resource.

It is appreciated that each round robin stage receives an enabling signal from subsequent round robin stage. For example, round robin stage 320 receives the enable signal 374 from round robin stage 350 that is subsequent to the round robin stage 320. Moreover, the round robin stage 350 receives enable signal 372 from a subsequent round robin stage (not shown). In some embodiments, a global enabling signal is also transmitted to each round robin stage that may be ANDed. In other words, the round robin stage operates only when both enabling signals are asserted high.

Figure 4:
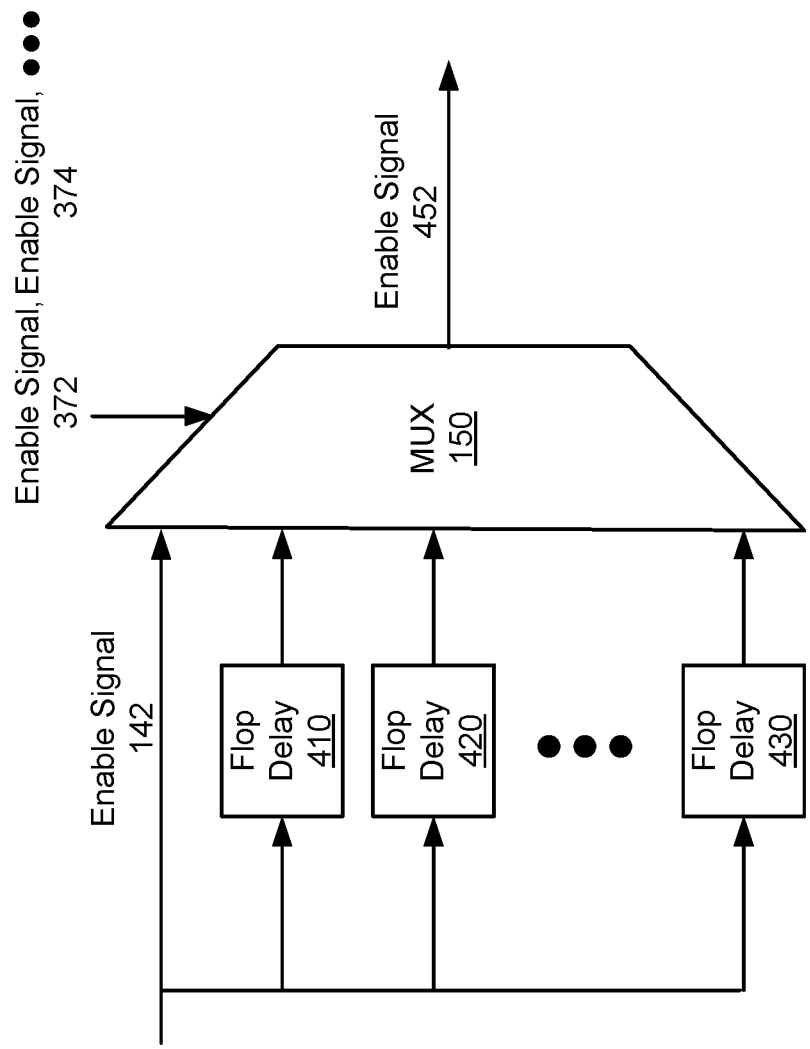
FIG. 4 shows generation of enable signal for a multistage arbitration architecture, according to some examples.

Referring now to FIG. 4, generation of enable signal for an Nth stage in multistage arbitration architecture, according to some examples is shown. The multiplexer 150 receives the global enable signal 142 along with the delayed versions for each round robin arbitration stage, e.g., flop delay 410 for stage n−2, flop delay 420 for stage n−3+stage n−2, . . . , flop delay 430 for stage 1+stage 2+ . . . +stage n−1. The multiplexer 150 receives the select signal, e.g., enable signal 372, enable signal 374, . . . , and selects the appropriate enable signal 452. The appropriate enable signal 452 may be then be transmitted to the corresponding round robin arbitration stage.

Figure 5:
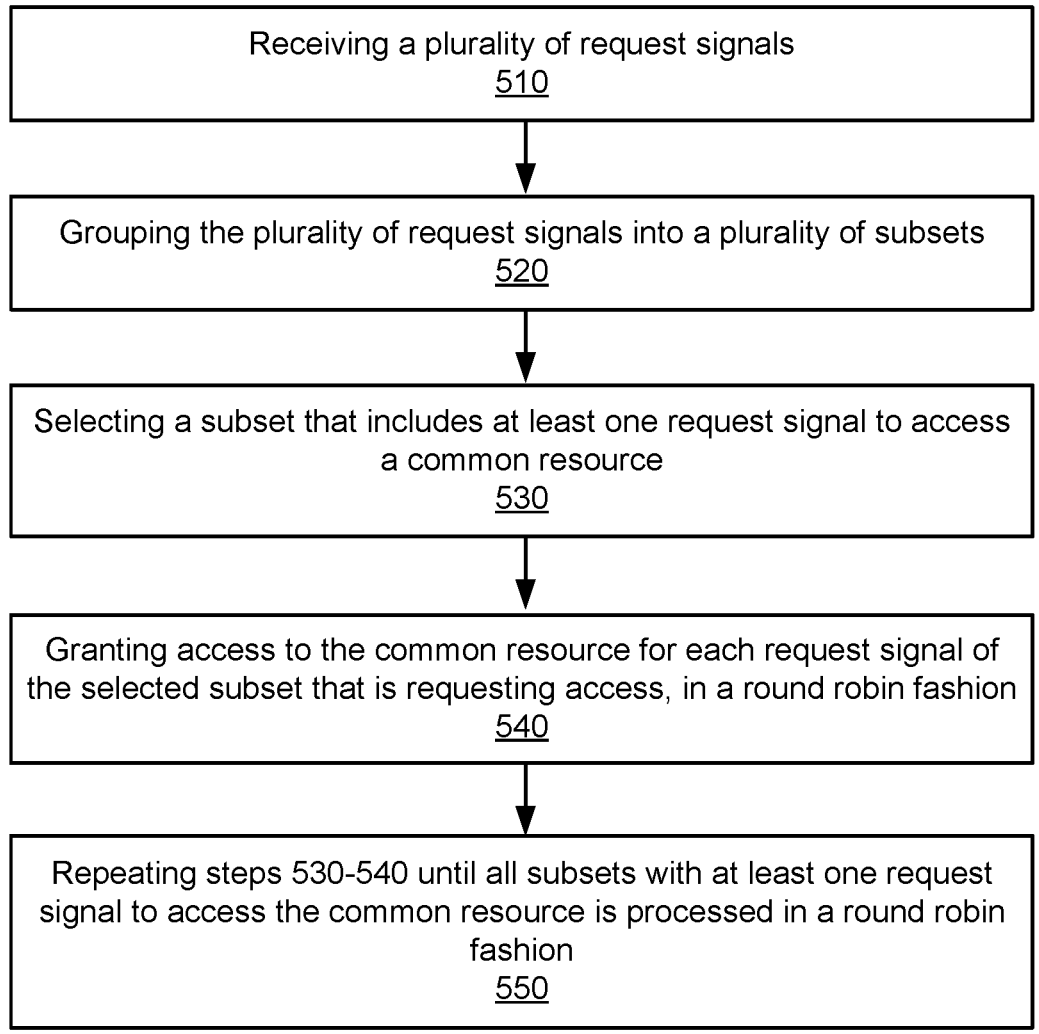
FIG. 5 shows a flow chart of an arbitration architecture, according to some examples.

Referring now to FIG. 5, a flow chart of an arbitration architecture, according to some examples is shown. At step 510, a plurality of request signals is received, as described above with respect to FIGS. 1A-4. At step 520, the plurality of request signals is grouped into a plurality of subsets, as described above with respect to FIGS. 1A-4. Each subset is processed, e.g., using logical OR gate, and a subset of the subsets is selected, e.g., using a round robin arbiter, at step 530. It is appreciated that the selected subset has at least one request signal that is asserted high indicating that it includes at least one component that is requesting access to the common resource. At step 540, the selected subset is processed and access is granted to each request signal within the selected subset that is requesting access to the common resource. It is appreciated that step 540 and granting access to request signals for the selected subset may be done in a round robin fashion. Steps 530-540 are repeated at step 550 until all subsets with at least one request signal to access the common resource is processed, in a round robin fashion. It is appreciated that the embodiments are described with respect to round robin arbitration for illustrative purposes and should not be construed as limiting the scope of the embodiments. For example, a similar architecture may be used for priority arbitration.

Figure 6:
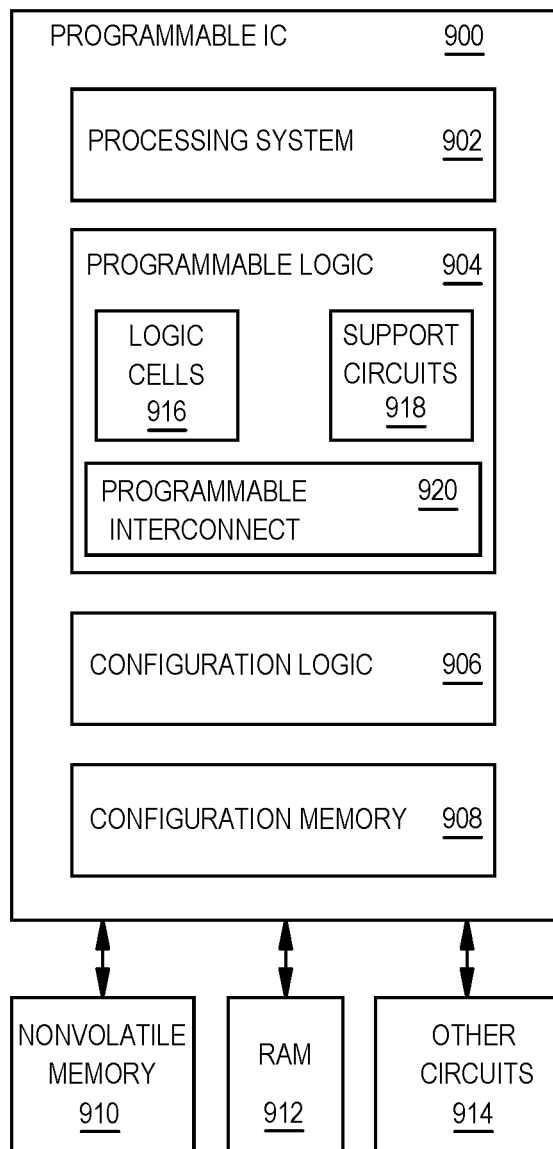
FIG. 6 is a block diagram depicting a programmable integrated circuit (IC), according to some examples.

FIG. 6 is a block diagram depicting a programmable integrated circuit (IC) 900 according to an example. The programmable IC 900 can implement the integrated circuit (IC) chip of systems of FIGS. 1A-5, in whole or in part. The programmable IC 900 includes a processing system 902, programmable logic 904, configuration logic 906, and configuration memory 908. The programmable IC 900 can be coupled to external circuits, such as nonvolatile memory 910, RAM 912, and other circuits 914.

In the example of FIG. 6, the processing system 902 can include microprocessor(s), memory, support circuits, IO circuits, and the like. The programmable logic 904 includes logic cells 916, support circuits 918, and programmable interconnect 920. The logic cells 916 include circuits that can be configured to implement general logic functions of a plurality of inputs. The support circuits 918 include dedicated circuits, such as transceivers, input/output blocks, digital signal processors, memories, and the like. The logic cells and the support circuits 918 can be interconnected using the programmable interconnect 920. Information for programming the logic cells 916, for setting parameters of the support circuits 918, and for programming the programmable interconnect 920 is stored in the configuration memory 908 by the configuration logic 906. The configuration logic 906 can obtain the configuration data from the nonvolatile memory 910 or any other source (e.g., the RAM 912 or from the other circuits 914).

Figure 7:
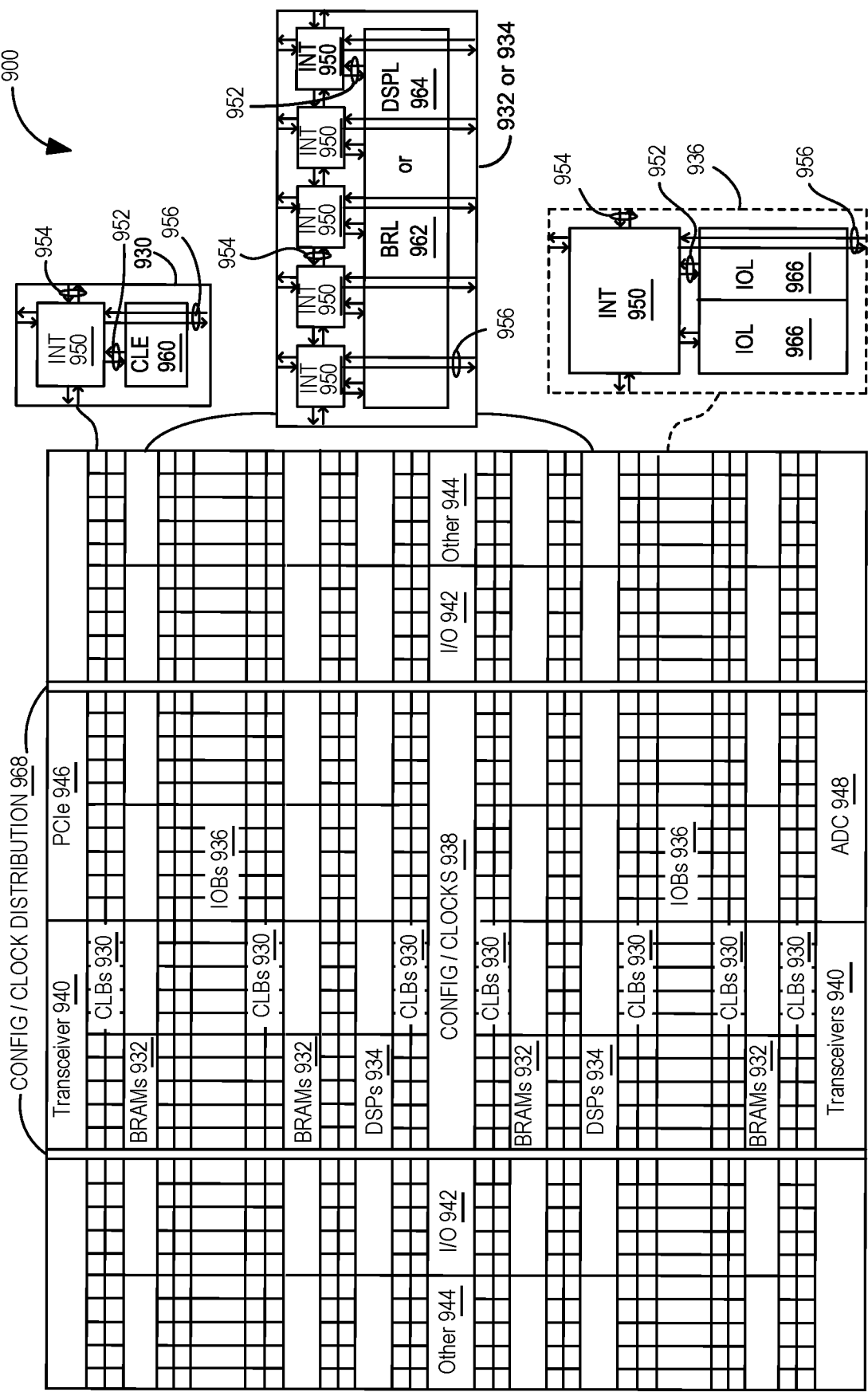
FIG. 7 is a field programmable gate array (FPGA) implementation of the programmable IC, according to some examples.

FIG. 7 illustrates an FPGA implementation of the programmable IC 900 that includes a large number of different programmable tiles including configurable logic blocks ("CLBs") 930, random access memory blocks ("BRAMs") 932, signal processing blocks ("DSPs") 934, input/output blocks ("IOBs") 936, configuration and clocking logic ("CONFIG/CLOCKS") 938, digital transceivers 940, specialized input/output blocks ("I/O") 942 (e.g., configuration ports and clock ports), and other programmable logic 944 such as digital clock managers, system monitoring logic, and so forth. The FPGA can also include PCIe interfaces 946, analog-to-digital converters (ADC) 948, and the like.

In some FPGAs, each programmable tile can include at least one programmable interconnect element ("INT") 950 having connections to input and output terminals 952 of a programmable logic element within the same tile, as shown by examples included in FIG. 9. Each programmable interconnect element 950 can also include connections to interconnect segments 954 of adjacent programmable interconnect element(s) in the same tile or other tile(s). Each programmable interconnect element 950 can also include connections to interconnect segments 956 of general routing resources between logic blocks (not shown). The general routing resources can include routing channels between logic blocks (not shown) comprising tracks of interconnect segments (e.g., interconnect segments 956) and switch blocks (not shown) for connecting interconnect segments. The interconnect segments of the general routing resources (e.g., interconnect segments 956) can span one or more logic blocks. The programmable interconnect elements 950 taken together with the general routing resources implement a programmable interconnect structure ("programmable interconnect") for the illustrated FPGA.

In an example implementation, a CLB 930 can include a configurable logic element ("CLE") 960 that can be programmed to implement user logic plus a single programmable interconnect element ("INT") 950. A BRAM 932 can include a BRAM logic element ("BRL") 962 in addition to one or more programmable interconnect elements. Typically, the number of interconnect elements included in a tile depends on the height of the tile. In the pictured example, a BRAM tile has the same height as five CLBs, but other numbers (e.g., four) can also be used. A signal processing block 934 can include a DSP logic element ("DSPL") 964 in addition to an appropriate number of programmable interconnect elements. An 10B 936 can include, for example, two instances of an input/output logic element ("IOL") 966 in addition to one instance of the programmable interconnect element 950. As will be clear to those of skill in the art, the actual I/O pads connected, for example, to the input/output logic element 966 typically are not confined to the area of the input/output logic element 966.

In the pictured example, a horizontal area near the center of the die is used for configuration, clock, and other control logic. Vertical columns 968 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A device comprising:
a plurality of logical gates configured to receive a plurality of request signals, wherein each logical gate of the plurality of logical gates is configured to receive a set of request signals of the plurality of request signals, wherein each request signal is associated with whether a component is requesting access to a common resource, wherein each logical gate of the plurality of logical gates is further configured to output a signal indicating whether a request signal of the corresponding set of request signals is asserted to access the common resource, and wherein each set of request signals of the plurality of request signals is formed based on priority associated therewith;
a first round robin arbiter configured to receive output signals from the plurality of logical gates, wherein the first round robin arbiter is configured to output an index signal identifying a logical gate of the plurality of logical gates where the request signal is asserted;
a multiplexer configured to receive the plurality of request signals, wherein the multiplexer is further configured to receive the index signal and wherein the multiplexer selects a set of request signals of the plurality of request signals corresponding to the request signal that is asserted; and
a second round robin arbiter configured to receive the selected set of request signals of the plurality of request signals from the multiplexer, and wherein the second round robin arbiter is further configured to grant access to the common resource to each request signal of the selected set of request signals that is requesting access to the common resource in a round robin fashion, and wherein the second round robin arbiter is further configured to output a first round robin enable signal to the first round robin arbiter to select another logic gate of the plurality of logical gates where a request signal is asserted;
a delay element coupled to the second round robin arbiter, wherein the delay element is configured to receive an enable signal and to delay the enable signal by an amount of time needed for the first round robin arbiter to generate the index signal, wherein the delayed enable signal initiates the second round robin arbitration signal to process received signals.

2. The device of claim 1, wherein the plurality of logical gates comprises a logical OR gate.

3. The device of claim 1, further comprising another multiplexer coupled to an output of the delay element, wherein the another multiplexer is configured to receive the delayed enable signal and further configured to receive the enable signal, and wherein the another multiplexer selects delayed enable signal or the enable signal based on the first round robin enable signal generated by the second round robin arbiter, and wherein the another multiplexer is configured to output the selected signal to the second round robin arbiter to initiate the second round robin arbiter to process received signals.

4. The device of claim 1, wherein the delay element is a flop delay.

5. The device of claim 1, wherein the first round robin arbiter is configured to receive the first round robin enable signal output and is further configured to select the another logic gate of the plurality of logical gates in a round robin fashion where a request signal is asserted to access the common resource, and wherein the first round robin arbiter is configured to output an updated index signal based on the another logic gate,
wherein the multiplexer is configured to receive the updated index signal and wherein the multiplexer selects another set of request signals of the plurality of request signals corresponding to the request signal that is asserted,
wherein the second round robin arbiter is further configured to receive the selected another set of request signals of the plurality of request signals from the multiplexer and wherein the second round robin arbiter is further configured to grant access to the common resource to each request signal of the selected another set of request signals in a round robin fashion.

6. The device of claim 5, wherein the second round robin arbiter is further configured to output another first round robin enable signal to the first round robin arbiter to select yet another logic gate of the plurality of logical gates where a request signal is asserted to access the common resource.

7. The device of claim 1, wherein the common resource is selected from a group consisting of a bus, storage memory, and network cards.

8. A device comprising:
a first stage round robin arbitration configured to receive a plurality of request signals, wherein each request signal is associated with whether a component is requesting access to a common resource, wherein the plurality of request signals is formed into a plurality of subset request signals based on priority associated therewith, and wherein the first stage round robin arbitration is configured to select a subset of request signals from the plurality of subset request signals; and
a second stage round robin arbitration configured to receive the selected subset and further configured to grant access to the common resource to each request signal of the selected subset that is requesting access to the common resource in a round robin fashion, wherein the second stage round robin arbitration is further configured to output an enable signal to the first stage round robin arbitration, wherein the first stage round robin arbitration is configured to select another subset of the plurality of request signals, and wherein the first stage round robin arbitration is further configured to transmit the selected another subset of the plurality of request signals to the second stage round robin arbitration for round robin processing thereof;

a delay element coupled to the second stage round robin arbitration, wherein the delay element is configured to receive an enable signal and to delay the enable signal by an amount of time needed for the first stage round robin arbitration to generate the selected subset, wherein the delayed enable signal initiates the second stage round robin arbitration to process received selected subset.

9. The device of claim 8, wherein at least one request signal within the selected subset is asserted to access the common resource.

10. The device of claim 8, wherein the first stage round robin arbitration selects the another subset of the plurality of request signals responsive to receiving enable signal from the second round robin stage, and wherein the another subset of the plurality of request signals comprises at least one request signal within the selected another subset that is asserted to access the common resource, and wherein the second stage round robin arbitration is configured to receive the selected another subset and grant access to the common resource to each request signal within the selected another subset that is requesting access to the common resource in a round robin fashion.

11. The device of claim 8, wherein the delay element is a flop delay.

12. The device of claim 8, wherein the first stage round robin arbitration comprises:
a plurality of logical gates configured to receive the plurality of request signals and output a plurality of logical output signals, wherein each logical gate of the plurality of logical gates receives a subset of the plurality of request signals;
a round robin arbiter configured to receive the plurality of logical output signals and select one subset of the plurality of request signals wherein the selected one subset includes at least one request signal to access the common resource in a round robin fashion; and
a multiplexer configured to receive the selected one subset and transmit the selected one subset to the second stage round robin arbitration.

13. The device of claim 12, wherein the plurality of logical gates includes a logical OR gate.

14. The device of claim 8, wherein the common resource is selected from a group consisting of a bus, storage memory, and network cards.

15. A method comprising:
receiving a plurality of request signals, wherein each request signal is associated with whether a component is requesting access to a common resource;
grouping the plurality of request signals into a plurality of subsets based on priority associated with request signals;
generating an index signal by a first round robin arbiter to select a subset of the plurality of subsets that includes at least one request signal asserted to access the common resource;
granting access to the common resource to each request signal of the selected subset that is requesting access to the common resource in a round robin fashion;
subsequent to the granting, selecting by a second round robin arbiter another subset of the plurality of subsets that includes at least one request signal asserted to access the common resource;
granting access to the common resource to each request signal of the selected another subset that is requesting access to the common resource in a round robin fashion; and
repeating the selecting and granting access until all requests signals within subsets of the plurality of subsets with at least one request signal asserted to access the common resource is granted access in a round robin fashion; and
receiving an enable signal, by a delay element coupled to the second round robin arbiter, and delaying the enable signal by an amount of time needed for the first round robin arbiter to generate the index signal, wherein the delayed enable signal initiates the second round robin arbiter to process received signals.

16. The method of claim 15, wherein the common resource is selected from a group consisting of a bus, storage memory, and network cards.

* * * * *